Sept. 28, 1965  M. J. KAKOS ET AL  3,208,190

CERAMIC TILE

Original Filed July 9, 1962

INVENTORS
MICHAEL J. KAKOS
JOHN V. FITZGERALD

BY

MORGAN, FINNEGAN, DURHAM & PINE

ATTORNEYS

United States Patent Office 3,208,190
Patented Sept. 28, 1965

3,208,190
CERAMIC TILE
Michael J. Kakos, Milltown, and John V. Fitzgerald, Metuchen, N.J., assignors to Tile Council of America, Inc., New York, N.Y., a corporation of New York
Original application July 9, 1962, Ser. No. 208,250. Divided and this application Aug. 26, 1963, Ser. No. 309,912
10 Claims. (Cl. 52—390)

This application is a division of our co-pending application Serial No. 208,250, filed July 9, 1962.

This invention relates to improved ceramic tile and to methods of treating ceramic tile to improve the properties thereof.

It is an object of the present invention to provide glazed ceramic tile having improved impact and fracture properties.

A further object of this invention is to provide glazed ceramic tile which is resistant to staining caused by ingredients in grouts and mortars used to set and point the tile.

Still another object of this invention is to pre-stain ceramic tile having translucent or transparent glazes.

A further object of this invention is to provide glazed ceramic tile having improved physical properties which is capable of being tenaciously bonded to a substratum by means of conventional adhesives.

A further object of this invention is to improve the wear resistance of ceramic tile glaze.

Still another object of this invention is to improve the compressibility and elastic modulus and increase the coefficient of expansion of glazed ceramic tile.

A further object of this invention is to provide new and improved tile installations.

Other objects of the present invention are to provide improved methods of treating ceramic tile to improve strength and wear resistant characteristics and to enhance their aesthetic appearance.

These and other objects of the present invention are achieved by impregnating the bisque of ceramic tile with sulfur, as will more clearly be brought out hereinbelow.

Ceramic tile is a ceramic surfacing unit, usually relatively thin in relation to facial area, made from clay or a mixture of clay and other ceramic materials, called the body or bisque of the tile, having either a glazed or unglazed face, and fired above red heat in the course of manufacture to a temperature sufficiently high to produce specific physical properties and characteristics.

Ceramic tile is ordinarily manufactured in small thin slabs. Thus, the size of ceramic tile pieces rarely exceeds about 54 square inches (9" x 6") and is usually equal to or less than about 17 square inches for glazed wall tile. The thickness of the tile is almost always less than 3/4" and when the tile is glazed rarely exceeds 1/2" and is usually less than 3/8". Ceramic tile having a surface area of about 432 square inches is available, but this size probably represents the upper limit on surface area. These thin slabs must be adhered or glued to a structural back-up wall such as masonry, concrete, cement asbestos board, plaster, gypsum wallboard, plywood or metal. Unlike brick or glazed structural block which when cemented together, one on top of the other, form a structural or free standing wall, ceramic tile and floor tile generally depend on some kind of back-up or support to form a structure. Accordingly, it is essential that ceramic tile have a surface with good bonding characteristics.

Ceramic tile may be glazed or unglazed. This invention is primarily, although not exclusively, concerned with glazed tile, which may be defined as ceramic tile which has a fused impervious facial finish composed of ceramic materials, fused onto the body of the tile. The tile may be a non-vitreous, semi-vitreous, vitreous, or impervious body. The glazed surface may be translucent, transparent, white or colored. A.S.T.M. for ceramic whitewares classifies four different degrees of vitrification as follows:

Degree of vitrification: Water absorption, percent

Impervious _____ Less than 0.5.
Vitreous _____ Less than 3.
Semi-vitreous _____ 3 to 7.
Non-vitreous _____ Over 7.

Water absorption test procedures are described in the examples hereinbelow.

Some of the many types of ceramic tile are ceramic mosaics, pavers, porcelain tile, quarry tile, faience tile, glazed interior tile, glazed tile-extra duty glaze, conductive tile, and special purpose tile.

By means of the specially controlled sulfur treatment disclosed herein less expensive glazed interior wall tile and glazed tile-extra duty glaze may be readily converted to a special purpose tile having improved properties.

Glazed interior wall tile is a glazed tile with a body that is suitable for interior use and which is usually non-vitreous. It is not ordinarily required or expected to withstand heavy duty wear or high impact.

Glazed tile, extra-duty glaze is tile with a durable glaze that is suitable for light-duty floors and all other surfaces on interiors where it is not subjected to excessive abrasion or impact.

The bisque or body of glazed wall tile is different from that of other ceramic tiles. Pores in such tile are microscopic, with the preponderance of pores ranging in size from about 0.1 to 2.5 microns in diameter. The void space present in the bisque of such tile may constitute from about 5 to 40 percent of total volume. Tile with this amount of void space is capable of absorbing between about 2 and 25 percent by weight of water. Usually the void space of glazed ceramic tile is between about 19 and 40 percent of total void space. Such tile is capable of absorbing between about 8 and 25 percent by weight of water.

In accordance with this invention it has been found that the strength of glazed non-vitreous tile may be increased by impregnation with sulfur. The increase in strength is substantial, and amounts to a factor of about 2 or 3, so that relatively weak non-vitreous glazed tile may be converted by sulfur impregnation to tile which is strong and which better resists impact and fracture.

The sulfur treatment disclosed herein not only renders ceramic tile substantially impervious to water, but also makes it impervious to reagents in addition to water. In the past, reagents in mortars or grouts used to set or point tile have been known to cause tile staining problems by migration through the tile bisque and deposition adjacent the translucent or transparent glazes. The migration of incipient staining media present in grouts and mortars is substantially prevented by the sulfur impregnation treatment disclosed herein.

The sulfur impregnation treatment when applied to special types of tile having transparent and translucent glazes and which also contain localized metallic deposits, such as lead salts, in the bisque, has also been found to uniformly darken the color of the tile and improve its aesthetic appearance. The color change can be likened to a staining treatment. The reason for the shade change is not completely understood, although it is believed that it results from the sulfur contacting the translucent or transparent glaze, thereby altering the angle of reflectance. Another possibility is that the sulfur reacts with the metallic deposits in the bisque to form dark metallic sulfides.

When tile surfaced with crystalline glaze and commonly used on countertops or high duty floors is impregnated with sulfur as described herein, it becomes much more durable and is capable of resisting impact to a much greater extent than is similar untreated tile. Additionally, the glaze on the treated tile is more tenacious and does not tear off as quickly as the glaze on untreated tile. The sulfur impregnation described also improves the compressibility and elastic modulus of the tile. This improvement is important from the tile setter's point of view and permits the tile to resist breakage sometimes caused by tapping the tile into place in the mortar bed.

Additionally, the sulfur impregnation produces an increase in the coefficient of expansion of the tile. The increase in coefficient of expansion leads to increased resistance to breakage and chipping caused by fluctuation in atmospheric temperature.

In carrying out the treatment, the tile is subjected to sulfur, as by immersion in a molten sulfur bath, for a period sufficient to permit substantially complete sulfur impregnation of the voids. When the sulfur has penetrated substantially all of the void volume, the tile is removed from the bath, and its surfaces are thoroughly wiped clean of sulfur. The tile is then cooled to room temperature to solidify the sulfur in the bisque. Any residual sulfur present on the surfaces of the tile bisque may then be removed, as, for example, by a solvent, or by abrasion.

Crude sulfur containing substantially 100 percent of the rhombic allotrope is preferred for use. Sulfur containing varying percentages of the amorphous allotrope has not been found to be effective.

In preparing the molten sulfur bath, best results are achieved if the bath not exceed a temperature of about 159° C. If the bath exceeds this temperature, some amorphous allotrope is formed during cooling. The amorphous form of sulfur is a long chain polymer and apparently cannot be readily wiped or removed from the tile surface even when the sulfur is in a liquid state. As a result, a residual sulfur film is left on the bonding surface of the tile bisque which gives rise to poor, although acceptable, bonding characteristics when an attempt is made to bond the tile to a substratum with conventional adhesives or mortar compositions. Possibly poor bond is caused by development of structural stresses in the interface associated with the density change when the amorphous form slowly changes to the rhombic.

Similar inferior results are obtained with sulfur containing substantial quantities of the amorphous allotrope, e.g., 20 percent or more, even though the temperature is maintained below about 159° C.

Sulfur in the liquid state is said to contain three allotropes, one of which is the amorphous form. The other allotropes are designated symbolically. Unless the amorphous form is initially present or formed by exceeding 159° C. during the process, it will be present in a relatively small amount. The transformation of the sulfur on freezing, in the absence of a large amount of the amorphous form, is to the monoclinic allotrope and then after a few hours, to the stable rhombic form.

It is important in conducting the process to insure that the tile surfaces and especially the bonding surfaces are completely free of sulfur, in order to insure that the tile will bond satisfactorily to a substratum. Removing sulfur on the surfaces of the tile is preferably accomplished by wiping the surfaces free of sulfur while it is still in a molten state, i.e., before the sulfur has congealed. Residual, congealed sulfur on the surfaces, if present, should be removed, as with sulfur solvents, such as carbon disulfide, or by abrasion, if good bonding is to be obtained.

The material used to wipe the surfaces clean of liquid sulfur should be absorptive, and should be inert to sulfur. Examples of materials that may be used include burlap and cheesecloth. Brushes, such as horsehair or synthetic fiber brushes, e.g., nylon, can also be used expeditiously to remove the sulfur when it is still in a liquid state.

Because of the small size of the pores in the tile bisque, it is desirable to preheat the tile and/or to use vacuum during the impregnation step in order to assure rapid penetration of the voids by the molten sulfur. By preheating the tile and employing vacuum, the molten sulfur fills not only the porous bisque of the tile, but also completely fills the voids adjacent or at the boundary between the glaze and the bisque. Additionally, the time for impregnation when vacuum and preheat are employed is substantially reduced.

The sulfur impregnation will generally be carried out at temperatures between about 120° C. and 159° C., although preferably the bath is maintained at a temperature of 145° to 155° C. As already indicated, the tile prior to immersion in the bath is preferably preheated to the temperature of the bath, and the system is operated under vacuum conditions. Preheat temperature for the tile may range from about 100° C. to 200° C., although usually the tile will be preheated to about the same temperature of the molten surfur. Vacuums of at least about 30 inches of mercury are especially suitable.

The amount of sulfur retained by the tile will of course depend upon the void space of the tile. In general, at least about 85 percent and preferably at least about 90 percent of the void space should be filled by liquid sulfur. With tile having a void space of between about 5 and 40 percent by volume, the amount of sulfur retained by the tile will generally amount to between about 5 and 40 percent by weight. For tile having a void space of between about 19 and 40 percent by volume, the amount of sulfur retained will generally amount to between about 12 and 40 percent by weight. In general, the amount of sulfur retained by the tile will be approximately twice the weight of water capable of being absorbed by the tile.

Liquid sulfur at a temperature just above its melting point has a density of about 1.81 gm./cc. Stable solid rhombic sulfur at about room temperature has a density of about 2.07 gm./cc. Hence, when the sulfur impregnated tiles described herein are cooled following impregnation, the liquid sulfur imbibed by the voids solidifies and decreases in volume. In other words, if the sulfur impregnation step was effective in completely filling all of the voids present in the bisque with liquid sulfur, upon cooling to room temperature, only about 85 percent of the original void volume would be filled with solid rhombic sulfur. This fact emphasizes the necessity of obtaining substantially complete impregnation of the void space with molten liquid sulfur, prior to cooling of the impregnated tile to room temperature.

When about 85 percent of the void space has been filled with liquid sulfur at a temperature above the melting point of sulfur, about 72 percent of the voids will be filled with solid sulfur at room temperature. At ordinary temperature, the percentage of the original void volume of the tile impregnated with solid sulfur will ordinarily vary between about 70 and 85 percent.

This amount of sulfur impregnation, however, has been discovered to be sufficient to achieve the new and useful properties of the treated tile described herein.

Additionally, it has been discovered that the reduction in volume of the sulfur upon cooling does not significantly effect the porosity of the impregnated tile bisque.

In cooling the tile to room temperature, it is desirable to place the tile glaze side down. This allows the molten sulfur to settle by gravity flow towards the glaze. As a result, the void areas left by shrinkage are concentrated at those portions of the pores closest to the bonding surface. This leads to concave shaped crevices or recesses in the tile bisque at the bonding surface. Formation of such recesses is also helped by the wiping step described thereinbelow. The bonding adhesive penetrates these recesses or crevices, and this phenomenon, it is felt, accounts at least in part for the strong bonds obtained with the sulfur impregnated tile of the present invention.

The following examples are illustrative of procedures used to treat tile according to the teachings contained herein, but are not intended to limit the scope of the invention except as such limitations may appear in the claims.

*Example 1*

A glazed wall non-vitreous tile supplied by American Olean Tile Co., Lansdale, Pennsylvania, weighing 166.4 grams and having a water absorption value of about 13.9 percent was dried to constant weight and placed on top of solid rhombic sulfur in a vacuum oven. The water absorption of the tile was determined by boiling the tile in water for about 2 hours and then permitting it to soak in the same water as it cooled for another 22 hours. The weight of water absorbed by the tile divided by the dry weight of the tile gives the water absorption value. The oven was evacuated to 30 inches of mercury and heated to 155° C. When the temperature of the sulfur reached approximately 115° C., the sulfur melted to an amber, mobile liquid. Consequently the tile became submerged in the bath. The vacuum seal was then broken and the tile allowed to remain submerged for another five minutes. Upon removal from the bath to room conditions, i.e., 25° C., the excess sulfur was allowed to drain from the tile body for a few seconds. Immediately thereafter, the article was wiped free of residual liquid sulfur with absorptive paper hand towels until "dry" in appearance. The wiping process consumed only about 10 or 15 seconds. At this point and by means of a phenomenon not understood at present, the last small wetted areas on the tile surface seemed to disappear or become dry. It was necessary to work quite rapidly to clean the sulfur from the bisque surface before it solidified. Removal and wiping in a warmer atmosphere would of course allow more time for sulfur removal before solidification. The treated article was cooled to room temperature and the weight gain ascertained to be 26.8 percent. Water absorption of the treated article was about 1.09 percent as determined by the aforementioned boiling water method, indicating that while substantially complete sulfur impregnation was obtained, there still was a definite volume of interconnecting void space.

*Example 2*

An American Olean non-vitreous glazed wall tile of the type described in Example 1 and weighing 165.6 grams was plunged, while at room temperature, into a molten sulfur bath maintained at a temperature of about 155° C. After two hours the tile was removed from the bath and immediately wiped clean of sulfur before it congealed as in Example 1. The weight of the treated tile was 211.0 grams. Knowing the original void volume of the tile, it was ascertained that substantially complete impregnation of the tile was accomplished.

*Example 3*

Imola (Italian) glazed non-vitreous wall tile having a dry weight of 155.0 grams was used in this example.

The tile was first tested for water absorption. To this end, the tile was dried slowly at room temperature to prevent rupture of thin walled pores that may have been present in the tile. The tile was then placed in an oven at 100° C. to remove the last traces of moisture. Following drying, the tile was placed in a chamber under a vacuum of 30 inches of mercury and then, while still under vacuum, plunged into water at room temperature. The vacuum seal was then broken and the tile allowed to remain submerged for another 10 minutes. Water absorption was calculated to be 21.3 percent. This method of determining water absorption is considered to be slightly more accurate than the method described in Example 1, wherein the value of 20.4 percent was recorded.

Using the process described in Example 1, the Imola tile, following drying as described hereinabove, was impregnated with sulfur. It was determined that the amount of sulfur absorbed was 38.0 percent by weight. Based on relative densities of liquid sulfur and water, this figure is equivalent to 21.0 weight percent water. The percentage of the void space filled with liquid sulfur was accordingly 21.0/21.3 or 98.5 percent. In other words, the amount of voids impregnated by sulfur was slightly less than theoretical. This discrepancy may be attributed to the higher viscosity of molten sulfur, as compared to water.

Water absorption of the treated tile using the procedure of Example 1 was found to be 1.27 percent. This amount of water absorption does not approximate the 11 to 14 percent void space which would be expected because of the shrinkage of sulfur in transforming from the liquid to the solid stable rhombic state. Apparently, the sulfur impregnation step seals some of the pores, thereby preventing ingress of water into such sealed pores. It was also to be expected that the shrinkage of the sulfur throughout the network of pores would leave voids. Although pores are probably formed by sulfur shrinkage, the majority of such pores, apparently, cannot be reached by the water because of the sealing action of the sulfur, probably caused by gravity flow of the liquid sulfur to the neck of the pores just prior to cooling. This factor probably accounts for the extremely low water absorption value of the impregnated tile.

*Example 4*

A National vitreous glazed wall tile weighing 287.5 grams and having a water absorption of 2.6 percent was impregnated as in Example 1. After impregnation the weight was ascertained to be 201.2 grams or a weight percentage gain of 4.77 percent.

*Example 5*

An American Olean non-vitreous glazed wall tile of the type described in Example 1 was heated to 155° C. The tile weighing 169.8 grams was then plunged into a molten sulfur bath maintained at a temperature of about 155° C. and removed 30 minutes later. After removal the surface was wiped free of all surface sulfur before it congealed. The final weight of the sulfur impregnated article was 215.1 grams. Since the absorption percentage was known, this figure indicated that substantially total impregnation of the tile with sulfur was accomplished.

*Example 6*

An American Olean non-vitreous glazed wall tile of the type described in Example 1 was heated to 200° C. and plunged into a molten sulfur bath maintained at a temperature of 155° C. Two hours later the article was removed from the bath and wiped free of all surface sulfur before it congealed. The weight before impregnation was 171.1 grams and after treatment was 217.3 grams. Since the absorption percentage was known, this figure indicated that substantially total sulfur impregnation was accomplished.

*Example 7*

An American Olean tile of the type described in Example 1 was plunged into a molten rhombic sulfur bath two inches in depth, both tile and sulfur bath being at a temperature of about 155° C. Immediately, a vacuum was drawn and held for three minutes, after which the seal was broken. The tile remained in the bath for another three minutes. After wiping, the tile was cooled and broken in two. Sulfur had penetrated fully to the tile glaze.

*Example 8*

Twelve American Olean glazed non-vitreous 4¼" x 4¼" wall tile were treated as in Example 1 using refined sulfur flowers. All residual sulfur and any that may have condensed on cooling after wiping, including all lint deposited from the wiping medium, was removed from the bisque (bonding) surface. The tile were prepared for shear bond strength tests by cutting each in half on a diamond saw.

A sanded thin set Portland cement tile mortar of the type supplied by L & M Tile Products, Inc., was used as the bonding material. A thickness of 1/8″ of the mortar was placed between two halves of the tile. The long side of each tile (factory finished with spacing lugs ground off) was offset approximately 1/4″ so that mortar covered 8 square inches. Four samples were tested for shear strength at 7 days, 28 days and 3 months after cure at room temperature and 50 percent relative humidity. Shearing was by compression loading at a rate of 2400 lbs./min. The average breaking strengths were 214, 213 and 209 p.s.i. respectively. Tile prepared for shear bond which were not wiped clean of sulfur generally fell apart or had unacceptably low bond strengths after 3 months.

*Example 9*

An Imola (Italian) glazed wall tile was placed in a small laboratory vacuum oven, above a pan of molten sulfur heated to 155° C., in such a manner that it could be knocked into the liquid while the vacuum was still intact. After allowing sufficient time for the tile to become heated to a temperature approximating that of the bath the tile was plungd into the mobile liquid. Immediately the vacuum seal was broken. The tile remained in the bath for another three minutes. After wiping, the tile was cooled and broken in two. Sulfur had penetrated fully to the tile glaze.

*Example 10*

Ten American Olean tile, 4¼″ x 4¼″ glazed wall tile, treated as in Example 1, were tested for bond strengths in a simulated conventional installation. Generally this technique requires a pre-soaking of absorptive non-vitreous tile so that water will not be removed from the Portland cement adhesive and cause incomplete cure. The treated tile were not pre-soaked for this test nor would they have to be in an actual conventional installation with straight Portland cement because the water absorption of this tile places it in the vitreous classification. Test specimens to which the tile were adhered were concrete beds of dimension 4⅜″ x 4⅜″ x 2″ in depth. The composition of the concrete was one part Portland cement, one-half part hydrated lime, four parts dry standard 20-30 Ottawa sand and one part water—all by volume. A screeding plane was used to prepare the surface which received the tile. One hour after preparing the mortar bed a neat skim coat of two parts Portland cement and one part water was applied on the back of each tile trimmed to 4″±1/32″ in one facial direction. The tile were then placed on the mortar bed and tapped lightly into position with the cut edge against one edge of the mold housing the concrete bed. After 16 hours the completed test assembly was removed from the molds and cured at 70° F. and 90 percent relative humidity. Five treated tile were tested for shear at 7 days and 2 months, and the results averaged. The procedure was to place the tile vertically in a Tinius-Olsen compression machine, with the cut edge of the tile upward. A steel key, ¼″ x ¼″ x 4½″ long, was placed between the upper head of the machine and a suitable leather cushion. The latter rested upon the cut edge of the tile. Load was at 50 lbs./sec.±10 lbs./sec. Average breaking strengths for the treated tile were:

7 days _____p.s.i__ 70
2 months _____p.s.i__ 86

The average breaking strengths were acceptable for ordinary commercial use.

*Example 11*

American Olean tile treated as in Example 1 were prepared for shear bond strength determinations as in Example 8 except that the thickness of the thin set layer was 1/32″. In the same series another group of tile were bonded with neat Portland cement, also in a thickness of 1/32″. Shear bond values after 7 days, 28 days, and 3 months for each of these series were as follows:

|  | Neat Portland Cement | Sanded Thin-Set |
|---|---|---|
| 7 Days_____p.s.i__ | 115 | 242 |
| 28 Days_____p.s.i__ | 119 | 190 |
| 3 Months_____p.s.i__ | 109 | 180 |

The shear bond values of the sulfur impregnated tile were acceptable for ordinary commercial use.

*Example 12*

Thirty-two Imola (Italian) ceramic non-vitreous wall tile 4¼″ x 4¼″ were treated as in Example 1. Eight others were treated similarly to those in Example 3 except that the total soaking time in the molten sulfur bath was 15 hours. The tile were set together with 28 untreated controls in 6 columns of 12 tiles in a semi-random type pattern on the back of a concrete slab using the sanded thin set mortar described in Example 8. After a two week "cure" period the panel was subjected to a freeze-thaw (5½ hours) cycle. The atmosphere in the treating chamber was initially saturated with warm water vapor, and the chamber was sealed. After 7 weeks of this accelerated exposure it was found by inspection that none of the treated tile were damaged and that all but 15 percent of the untreated tile had succumbed to frost spalling damage.

*Example 13*

A number of Italian Imola non-vitreous wall tile treated as in Example 1 were set horizontally on a concrete slab in an exterior, naturally exposed area in New Jersey in October. Untreated controls were set adjacent the treated tile. Two different adhesives were used, i.e., an organic tile setting compound of the type supplied by Miracle Adhesives and a sanded thin set Portland cement mortar as described in Example 8. After five months of natural freeze-thawing winter conditions the installation was examined. All untreated tile were spalled to some extent whereas all the sulfur treated samples were undamaged.

*Example 14*

Four American Olean non-vitreous glazed wall tile were treated as in Example 1. These were set on 3 equidistant points and loaded dead center. A reading was recorded on a Tinius-Olsen compression machine at the point of failure. Failure was in tension. Average (direct reading) for four treated tile was 331 lbs. and that for four similar but untreated controls was 167 lbs.

*Example 15*

A 4¼″ x 4¼″ glazed tile and a crystalline glazed wall tile supplied by Pomona Tile Mfg. Co., Los Angeles, California, were impregnated with sulfur following the procedure of Example 1. The treated tile were quartered and individually set vertically in a Tinius-Olsen machine for compressive strength determination. The average strength values were 25,250 p.s.i. for the sulfur treated glazed tile and 23,800 p.s.i. for the sulfur treated crystalline glazed tile. Respective Young's moduli were 3.8 x $10^6$ and 3.6 x $10^6$. Corresponding values for the control untreated tile were compressive strengths of 7,800 p.s.i. and 7,685 p.s.i. and Young's moduli of 1.6 x $10^6$ and 2.5 x $10^6$ respectively. A commercially available vitreous "frost-proof" 4¼″ x 4¼″ glazed wall tile was tested for comparison and found to have a compressive strength of 13,285 p.s.i.

Example 16

A number of treated and untreated American Olean glazed wall tile similar to those referred to in Example 1 were set on plywood with epoxy mortar adhesive supplied by L & M Tile Products, Inc. The tile was set to form a 3' x 3' floor panel having four quadrants as follows:

(I) Sulfur treated glazed tile;
(II) Sulfur treated crystalline glaze tile;
(III) Untreated glazed tile;
(IV) Untreated crystalline glaze tile.

After allowing the installed panel to cure it was subjected to a Robinson Floor Tester. This test involved the cycling travel of rubber and steel wheels over the panel. First, rubber wheels at a load of 80 lbs./wheel were run over the panel for 1 hour. Next another 80 lbs. were added to each wheel and these in turn cycled for another hour. For the third hour still another 80 lbs./wheel were added. After the third hour the rubber wheels were replaced by steel wheels and the weight and time per cycle conditions repeated. No damage occurred until the fifth hour. The first tile to spall were untreated glazed tile. At the completion of the test (one-half hour with 240 lbs./ wheel beyond the above) all untreated glaze tile were void of glaze, which lay in the wheel path. Untreated crystalline glazed tile had succumbed to glaze deep impact damage. Treated glazed tile were damaged after the untreated crystalline glaze and received only minor impact damage on the cushion edges of the tile. Crystalline glazed treated tile were undamaged. All tile were still finely bonded to the plywood base at the conclusion of the test.

Example 17

A non-vitreous wall tile supplied by Robertson Mfg. Co., Trenton, New Jersey, was treated as in Example 1. The thermal expansion coefficient in the range of 25.5 to 73° C. was determined and compared to an untreated control. The coefficient of expansion for the treated tile was $16.8 \times 10^{-6}$ cm./cm./° C. while the untreated tile was $10.5 \times 10^{-6}$ cm./cm./° C.

Example 18

A panel constructed as described in Example 16 was tested for impact damage. The tile set in this instance were Imola (Italian) glaze wall tile and Hermosa crystalline glaze wall tile. For each brand the sulfur treated tile were twice as resistant to impact damage as were the untreated versions. Impact damage was measured by ascertaining the maximum height a one pound steel ball could be dropped without damaging the glaze of the tile to any extent.

Although in the above examples non-vitreous glazed ceramic tile are employed, it should be understood that the improved sulfur impregnation steps described herein may also be applied to vitreous as well as non-vitreous tile, and generally to all porous masonry materials such as concrete, clay, fire clay, and the like.

Example 19

A National glazed wall tile 4¾" x 6" x ¼" having a water absorption of 15.3 percent was impregnated as in Example 7. Before impregnation the tile weighed 268.0 grams. After filling with sulfur it weighed 345.0 grams and was ascertained to be fully impregnated as determined by comparing percentage weight gain of sulfur with the water absorption value. Later the treated tile was adhered to 3/16" cement asbestos board with the L & M Thin-Set Adhesive described in Example 8. A similar untreated tile was set in like manner to the same board. Both panels were soaked for one week in an aqueous solution containing dye, so that the saturation conditions of a damp area might be simulated. After one week both structures were examined. The color barrier had soaked through the entire structure to the glaze of the untreated control sample. No discoloration was evident on the sulfur impregnated tile glaze.

Example 20

A 4¼" x 6" x ¼" crystalline glazed Hermosa tile having a water absorption of 13.1 percent was impregnated with sulfur as in Example 7. This was fully impregnated with 24.4 percent by weight of sulfur. Later it was adhered to ⅝" plywood with a polyester type setting material supplied by Atlas Mineral Products under the tradename "Furnace." After allowing the tile to set for one week, this assembly was compared for relative impact strength using the method outlined in Example 18 with another assembly prepared with similar but untreated tile. The assembly with the treated tile was twice as resistant to impact damage as was the assembly using untreated tile.

Example 21

A 16" x 12" glazed tile, brown bisque, from Stylon having a water absorption of 3.1 percent was impregnated with sulfur as in Example 1. After impregnation the weight percentage gain of sulfur was ascertained to be 5.2 percent.

Example 22

Four Robertson 2" x 2" glazed wall tile were impregnated with sulfur using the method outlined in Example 7. The tile had an average absorption percentage of 16.5. The treated tile were adhered to National Gypsum vinyl wallboard with an organic adhesive supplied by Minnesota Mining and Manufacturing Company under the tradename "CTA–11." This adhesive passes commercial specification CS–181–52. The structure was placed in a shower booth after one week's cure and a continuous spray of cold water directed at it for a week. At this time an attempt was made to pry the tile from the board. All tile were found to be firmly adhered to the substrata following this treatment.

Example 23

A Mosaic glazed non-vitreous wall tile was sulfur treated as in Example 1 and suspended by a strip of Scotch tape so as to hang freely. When tapped the tone heard was higher in pitch than the one heard by tapping on untreated control. The higher sonic pitch indicated that the sulfur treatment increased the elastic modulus of the tile thereby making it more rigid.

Example 24

A Mosaic white glazed non-vitreous wall tile treated with sulfur as in Example 1 was submerged in a dye solution with a similar tile which was not treated. After two hours both tile were removed. The glaze of the sulfur treated tile was not blotched wtih dark stains seen through the glaze as was the untreated tile.

Example 25

A number of Imola (Italian) light yellow glazed wall tile were sulfur treated as in Example 1. This treatment slightly darkened the glaze in a uniform manner.

The present invention will be made more clear by reference to the accompanying drawing, in which.

Figure 1:
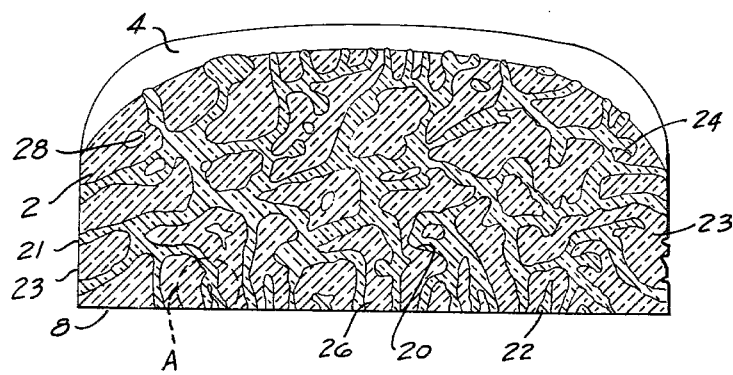
FIGURE 1 is a schematic ilustration of a cross section of the improved ceramic tile disclosed herein.

In FIGURE 1, 2 represents the porous bisque and 4 represents the surface glaze of the ceramic tile. As shown at 8, the unglazed surface of the bisque is substantially free of sulfur.

Characteristic of ceramic tile is the many different types of pores present. A loop pore is shown at 20; a blind alley pore is shown at 22; a pocket pore is shown at 24; a channel pore is shown at 26; and a sealed pore is shown at 28. Some of these may not be fully reached without the additional aid of vacuum. Dark shading 21 in the void area represents sulfur which has been impregnated into the pores. It will be understood that the sulfur does not necessarily fill every void, e.g., sealed pores like that shown at 8, will usually not be filled with sulfur, and also that some void space is left after the liquid sulfur shrinks on freezing to the monoclinic and ultimately the rhombic state.

Figure 2:
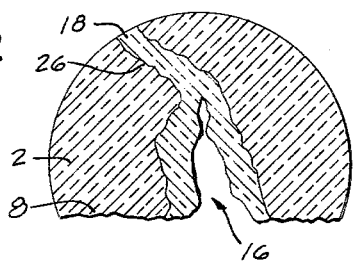
FIGURE 2 is an exploded view of a small portion of the cross section shown at A in FIGURE 1.

FIGURE 2 shows a typical channel shaped pore 26 starting at the bisque surface 8. The channel 26 is partially filled with sulfur as shown at 18. The sulfur 18 however defines inwardly concave shaped openings 16 extending from the bonding surface 8 of the bisque towards the interior of the bisque.

Figure 3:
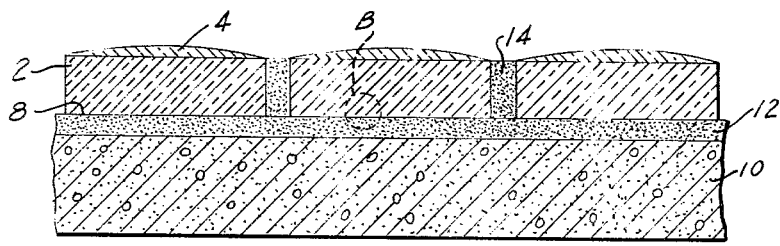
FIGURE 3 is a cross section of a tile installation employing the improved ceramic tile of Example 1.

In FIGURE 3, a plurality of the sulfur impregnated tile shown in FIGURE 1 are bonded to a substrate 10 by means of a suitable mortar 12. Grout 14, which may be the same material as the mortar 12 or a different material, fills the spaces between the tile as shown.

Figure 4:
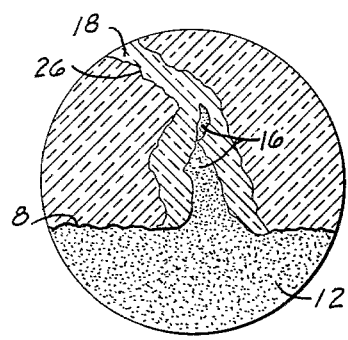
FIGURE 4 is an exploded view of a small portion of the cross section shown at B in FIGURE 3.

Generally, during the sulfur treating process, the tile after wiping is set glaze side down and bonding surface up, so that the liquid sulfur will not flow to the bonding face. By placing the tile glaze side down the sulfur settles by gravity flow on the sides of the pores closest to the glaze side. This then allows the void areas left by shrinkage to be more concentrated at those portions of the pores closest to the bonding surface. As a result, the bonding surface of the tile is replete with concave shaped openings of the type shown at 16 in FIGURE 2 and FIGURE 4. These channels also exist along the lateral walls 23 of the tile. As pointed out hereinabove, the formation of the concave shaped openings 16 is aided by the sulfur wiping step. These openings extend from the surface of the bisque inwardly towards the interior of the tile. The mortar or grout used to set and point the tile penetrated the myriad or plurality of channels present at the bonding surfaces of the bisque, thereby leading, at least in part, to the improved bonding characteristics of the treated tile described herein. This bonding mechanism is shown in FIGURE 4. Note how in FIGURE 4 the bonding mortar 16 penetrates and seals the concave shaped opening 16, thereby forming a myriad of separate bond reinforcing areas between the tile and substrata. Although it is not absolutely certain that the mortar penetrates as fully as is shown, the mortar penetration is apparently sufficient to cause a satisfactory mechanical grip.

The invention in its broader aspects is not limited to the specific embodiments described, but departures may be made therefrom within the scope of the accompanying claims without departing from the principles of the invention and without sacrificing its chief advantages.

What is claimed is:

1. A building structure comprising a substratum, a plurality of ceramic tile, an adhesive cement between the tile and the substratum and bonding the base of the ceramic tile to the surface of the substratum, said ceramic tile base comprising a porous bisque having void spaces including channels extending inwardly into the tile from the bonding surface of the tile base, at least about 70 percent of the void space, including the channels in the bisque, being filled with solid sulfur, said channels being only partially filled with sulfur so as to define concave shaped openings in the bonding surface of the tile base, and adhesive cement extending into said concave shaped openings, the sulfur content of said ceramic tile being between about 5 and 40 percent, based upon the weight of said tile.

2. The building structure of claim 1 wherein the bonding surface of the base of the tile bisque is substantially free of sulfur.

3. The building structure of claim 1 wherein at least about 85 percent of the void space in the bisque is filled with solid sulfur.

4. The building structure of claim 1 wherein the ceramic tile have a surface area of less than about 432 square inches and a thickness of less than about ¾".

5. The building structure of claim 1 wherein the ceramic tile are glazed ceramic tile having a surface area of less than about 17 square inches and a thickness of less than about ⅜".

6. As a new article of manufacture, a ceramic tile having a porous bisque comprising void spaces, including a plurality of channels extending from at least one surface of the tile bisque inwardly into the interior of the bisque, at least about 70 percent of the void space in the bisque being filled with solid sulfur, such that the amount of sulfur ranges between about 5 and 40 percent, based upon the weight of the ceramic tile, said channels being only partially filled with solid sulfur so as to define concave shaped openings in said surface which are capable of receiving adhesive cement.

7. The article of claim 6 wherein the surface of the tile containing the concave shaped openings is substantially free of sulfur.

8. The article of claim 6 wherein at least about 85 percent of the void space in the bisque is filled with solid sulfur.

9. The article of claim 6 wherein the ceramic tile has a surface area of less than about 432 square inches and a thickness less than about ¾".

10. The article of claim 6 wherein the ceramic tile is glazed ceramic tile having a surface area of less than about 17 square inches and a thickness less than about ⅜".

References Cited by the Examiner

UNITED STATES PATENTS

| | | | |
|---|---|---|---|
| 1,693,715 | 12/28 | Kobbe | 161—270 |
| 1,694,730 | 12/28 | Bleecker | 106—56 |
| 2,308,650 | 1/43 | Desagnat | 52—388 |
| 2,931,751 | 4/60 | Du Fresne | 52—515 X |

RICHARD W. COOKE, JR., *Primary Examiner.*

HENRY C. SUTHERLAND, JACOB L. NACKENOFF, *Examiners.*